US008831969B1

(12) United States Patent
Guo et al.

(10) Patent No.: US 8,831,969 B1
(45) Date of Patent: Sep. 9, 2014

(54) SYSTEM AND METHOD FOR DETERMINING USERS WORKING FOR THE SAME EMPLOYERS IN A SOCIAL NETWORK

(71) Applicant: LinkedIn Corporation, Mountain View, CA (US)

(72) Inventors: Jiaqi Guo, Mountain View, CA (US); Baoshi Yan, Belmont, CA (US); Alexis B. Baird, San Francisco, CA (US); Daniel Tunkelang, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/044,218

(22) Filed: Oct. 2, 2013

(51) Int. Cl.
*G06Q 10/00* (2012.01)

(52) U.S. Cl.
USPC ........................................................ 705/7.29

(58) Field of Classification Search
CPC ............................... G06Q 50/01; G06Q 50/02
USPC ........................................................ 705/7.29
See application file for complete search history.

(56) References Cited

U.S. PATENT DOCUMENTS

| | | | | |
|---|---|---|---|---|
| 4,328,561 | A * | 5/1982 | Convis et al. | 715/257 |
| 4,837,831 | A * | 6/1989 | Gillick et al. | 704/245 |
| 5,818,952 | A * | 10/1998 | Takenouchi et al. | 382/101 |
| 5,857,179 | A * | 1/1999 | Vaithyanathan et al. | 1/1 |
| 5,926,812 | A * | 7/1999 | Hilsenrath et al. | 707/737 |
| 6,078,924 | A * | 6/2000 | Ainsbury et al. | 1/1 |
| 6,430,539 | B1 * | 8/2002 | Lazarus et al. | 705/7.31 |
| 6,556,991 | B1 * | 4/2003 | Borkovsky | 707/737 |
| 6,578,032 | B1 * | 6/2003 | Chandrasekar et al. | 1/1 |
| 6,918,086 | B2 * | 7/2005 | Rogson | 715/257 |
| 7,065,483 | B2 * | 6/2006 | Decary et al. | 704/7 |
| 7,165,078 | B2 * | 1/2007 | Lang et al. | 1/1 |
| 7,266,367 | B2 * | 9/2007 | Vander Veen et al. | 455/415 |
| 7,325,012 | B2 * | 1/2008 | Nagy | 1/1 |
| 7,444,351 | B1 * | 10/2008 | Nomiyama | 1/1 |
| 7,580,884 | B2 * | 8/2009 | Cook | 705/38 |
| 7,590,940 | B2 * | 9/2009 | Hurewitz | 715/738 |
| 7,596,597 | B2 * | 9/2009 | Liu et al. | 709/204 |

(Continued)

OTHER PUBLICATIONS

Culotta, Aron et al., Extracting social networks and contact information from email and the web University of Massachusetts, Computer Sicence Department Faculty Publication Series, 2004.*

(Continued)

*Primary Examiner* — Scott L Jarrett
(74) *Attorney, Agent, or Firm* — Park, Vaughan, Fleming & Dowler LLP

(57) ABSTRACT

A system, apparatus, computer-program product and method are provided for identifying members of a particular user segment. One particular user segment of interest includes members who work for employers having a number of employees within a predetermined range. Members of an online service provide data purporting to identify their employers and/or other personal or professional attributes. The data entries are normalized by standardizing terms, removing superfluous or unneeded terms, and/or performing other processing. The members are then clustered according to their normalized employer names, and members within clusters that have sizes within the range are added to the user segment. Invalid employer names (e.g., fictitious companies, non-existent entities) may be filtered out. Within a cluster, a professional social networking site (or other site) may be analyzed to determine if the clustered members have developed relationships; if not, the cluster may be cancelled.

13 Claims, 3 Drawing Sheets

(56) References Cited

U.S. PATENT DOCUMENTS

| | | | | |
|---|---|---|---|---|
| 7,630,978 | B2* | 12/2009 | Li et al. | 1/1 |
| 7,644,146 | B2* | 1/2010 | Huberman et al. | 709/223 |
| 7,685,201 | B2* | 3/2010 | Zeng et al. | 707/748 |
| 7,765,257 | B2* | 7/2010 | Chen et al. | 709/204 |
| 7,844,466 | B2* | 11/2010 | Roy | 704/275 |
| 7,904,461 | B2* | 3/2011 | Baluja et al. | 707/749 |
| 7,912,865 | B2* | 3/2011 | Akerman et al. | 707/802 |
| 7,953,724 | B2* | 5/2011 | Griffith | 707/708 |
| 7,958,120 | B2* | 6/2011 | Muntz et al. | 707/736 |
| 8,078,677 | B2* | 12/2011 | Mendiola | 709/204 |
| 8,090,665 | B2* | 1/2012 | Yang et al. | 705/319 |
| 8,122,013 | B1* | 2/2012 | Qian et al. | 707/722 |
| 8,122,053 | B2* | 2/2012 | White | 707/780 |
| 8,244,674 | B2* | 8/2012 | Davis et al. | 707/622 |
| 8,370,328 | B2* | 2/2013 | Woytowitz et al. | 707/719 |
| 8,484,083 | B2* | 7/2013 | Basu et al. | 705/14.66 |
| 8,484,148 | B2* | 7/2013 | Johnston | 706/46 |
| 8,484,186 | B1* | 7/2013 | Kapczynski et al. | 707/706 |
| 8,560,385 | B2* | 10/2013 | Atazky et al. | 705/14.19 |
| 8,606,787 | B1* | 12/2013 | Asgekar et al. | 707/737 |
| 8,612,293 | B2* | 12/2013 | Benyamin et al. | 705/14.54 |
| 8,645,124 | B2* | 2/2014 | Karov Zangvil | 704/9 |
| 2003/0195868 | A1* | 10/2003 | Wilson et al. | 707/3 |
| 2006/0080422 | A1* | 4/2006 | Huberman et al. | 709/223 |
| 2008/0059172 | A1* | 3/2008 | Bocking | 704/235 |
| 2008/0065623 | A1* | 3/2008 | Zeng et al. | 707/5 |
| 2010/0005048 | A1* | 1/2010 | Bodapati et al. | 706/47 |
| 2010/0306249 | A1* | 12/2010 | Hill et al. | 707/769 |
| 2011/0185020 | A1* | 7/2011 | Ramamurthy et al. | 709/204 |
| 2011/0231399 | A1* | 9/2011 | Zhang et al. | 707/737 |
| 2012/0259785 | A1* | 10/2012 | Ha | 705/304 |
| 2012/0290375 | A1* | 11/2012 | Truong et al. | 705/14.17 |
| 2013/0124474 | A1* | 5/2013 | Anderson | 707/634 |
| 2013/0124524 | A1* | 5/2013 | Anderson | 707/737 |
| 2013/0132410 | A1* | 5/2013 | Rineer | 707/758 |
| 2013/0268452 | A1* | 10/2013 | MacEwen et al. | 705/321 |

OTHER PUBLICATIONS

Friedland, Lisa, Finding Tribes: Identifying Close-Knit Individuals from Employment Patterns Computer Science Department Faculty Pulication Series, 2007.*

Delgado, Agustin D. et al., Unsupervised Real-Time Company Name Disambiguation in Twitter Association for the Advancement of Artificial Intelligence, AAIA Techhical Report WS-12-02, 2012.*

Jin, Hai et al., Name Disambiguation using Semantic Association Clustering IEEE Conference on e-Business Engineering, 2009.*

Spina, Damiano et al., Discovering Filter Keywords for Company Name is Disambiguation in Twitter Elsevier, Mar. 6, 2013.*

Nussbaum, Ronald et al., Clustering Social Networks Using Distance-preserving Subgraphs International Conference on Advances in Social Network Analysis and Mining, IEEE, 2010.*

Treeratpituk, Pucktada et al., Automatically Labeling Hierarchical Clusters Proceedings of the 2006 International Conference on Digital Government Research, 2006.*

On, Byung-Won et al., Scalable clustering methods for the name disambiguation problem Knowledge Information Systems, vol. 31, 2012.*

Elmacioglu, Ergin et al., PSNUS: Web People Name Disambiguation by Simple Clustering with Rich Features Proceedings of the $4^{th}$ International Workshop on Semantic Evaluations, SemEval'07, Jun. 2007.*

Wang, Feng et al., Name Disambiguation Using Atomic Clusters The $9^{th}$ International Conference on Web-Age Information Management, Jul. 20-22, 2008.*

Mailn, Bradley et al., A Network Analysis Model for Disambiguation of Names in Lists Computational & Mathematical Organization Theory, vol. 11, 2005.*

Jensen, Jonnie, Are you using LinkedIn People You May Know? LiveAndSocial.com, Mar. 28, 2012.*

Dodds, Leigh, An Introduction to FOAF (Friend of a Friend) XML. com, Feb. 4, 2004.*

Klass, Vanessa, Who's Who in the World Wide Web: Approaches to Name Disambiguation Jan. 31, 2007.*

Richarme, Michael, Business Segmentation: Emerging Approaches to More Meaningful Clusters Decision Analyst, 2004.*

Better Business Banking Segmentation: Understanding Lifecycle Needs Hitachi Consulting, On Financial Services, Q2, 2010.*

Neckopulos, mim, Better Business Banking Segmentation: Understanding Lifecycle Needs—Part 2 American Bankers Association, Commercial Insights, Jul. 2010.*

Berry, Alexander, Using Market Segmentation for Corporate Customers Commercial Lending Review, vol. 10, No. 3, Summer 1995.*

Apte, C. et al., Segmentation-Based Modeling for Advanced Targeted Marketing In Proceedings of the Seventh ACM SIGKDD International Conference on Knowledge Discovery and Data Mining, 2001.*

Dolnicar, Sara, Using cluster analysis for market segmentation—typical misconceptions, established metholodical weaknesses and some recommendations for improvement, University of Wollongong, 2003.*

Wind, Yoram (Jerry) et al., Market Segmentation The Marketing Book, Aug. 8, 2007.*

* cited by examiner

SYSTEM AND METHOD FOR DETERMINING USERS WORKING FOR THE SAME EMPLOYERS IN A SOCIAL NETWORK

BACKGROUND

A system, apparatus, method and computer-program product are provided for processing and analyzing profiles of users of a computer or online system or service, to determine whether they belong to a predefined category or segment of users.

Online systems and services maintain profiles of their users, which the users themselves may be able to configure or modify. Some users, however, do not correctly or completely configure their profiles, whether due to a lack of interest, lack of time and/or some other reason. For example, they may provide a partial answer to a requested field or data attribute, may provide a short-hand answer that is not readily understood, may misspell words or use unusual abbreviations when entering information, etc.

An online system or service may desire to make an offer to users that match a particular attribute or characteristic, but for those users who have not fully or correctly configured their profiles, or who have otherwise provided incorrect or incomplete information, the system will be unable to determine whether they qualify.

DETAILED DESCRIPTION

Embodiments of a system, apparatus, method and computer-program product are provided for determining whether a user (e.g., a user of an online service) belongs to a particular category or segment of users, without any clear or explicit indication of such membership. In these embodiments, for example, different users that characterize themselves differently, such as by configuring a given user attribute(s) in different manners, are nonetheless determined to belong to the same category or segment of users.

Figure 1:
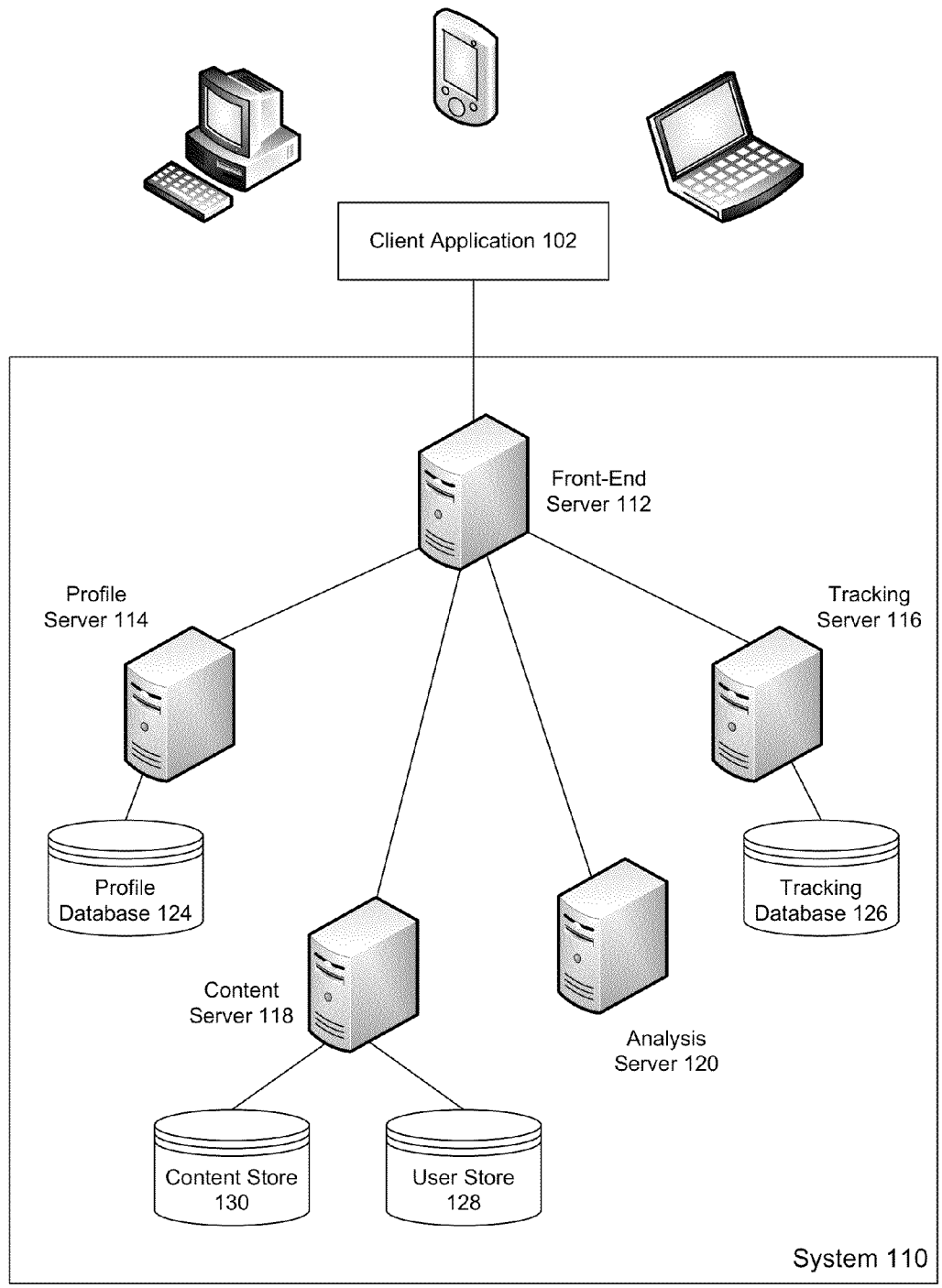
FIG. 1 is a block diagram depicting a system in which users or members are categorized or placed into predefined user segments, in accordance with some embodiments.

FIG. 1 is a block diagram depicting a system in which user profiles are analyzed in order to categorize the corresponding users or determine whether they belong to a particular predefined segment, according to some embodiments.

System 110 hosts an online service or application for use by operators or users of client devices that execute a compatible client application 102. A client device may be stationary (e.g., a desktop computer, a workstation) or mobile (e.g., a smart phone, a tablet computer, a laptop computer) in nature. Client application 102 may be a browser program or an application designed specifically to access the service(s) offered by system 110. Users of system 110 may be termed members because they may be required to register with the system in order to access all system services or receive all benefits offered by the system.

User connections are generally made through front-end server 112, which may comprise a portal, web server, application server, data server and/or other software and hardware modules. System 110 also includes profile server 114, tracking server 116, content server 118, analysis server 120, profile database 124, tracking database(s) 126, user data store 128 and content store 130. The system may include other components not depicted in FIG. 1.

In some specific embodiments, system 110 hosts a professional social networking service or site that allows and helps users to create, develop and maintain professional (and personal) relationships. As part of the service, system 110 serves content for presentation to users via the client application, which may include content generated or suggested by other users (e.g., text, images, video, audio), messages between users, offers from members and/or non-members, advertisements, announcements, job listings, status updates, and so on.

Profile server 114 maintains profiles, in profile database 124, of members of the service hosted by system 110. A member's profile may reflect any number of attributes or characteristics of the member, including personal (e.g., gender, age or age range, interests, hobbies), professional (e.g., employment status, job title, employer, skills, endorsements, professional awards), social (e.g., organizations the user is a member of, geographic area of residence, friends), educational (e.g., degree(s), university attended, other training), etc.

Tracking server 116 monitors and records activity of system 110 and/or members (e.g., in tracking database(s) 126). For example, whenever content is served from front-end server 112 (e.g., to a client device), the tracking server records what is served, to whom (e.g., which member), and when. Similarly, the tracking server also records member actions regarding advertisements and/or other content presented to the members (e.g., clicks, conversions, follow-on requests), to include identities of the member and the content acted upon, what action was taken, when, etc.

Content server 118 maintains one or more repositories of content items for serving to members (e.g., content store 130), an index of the content items, and user store 128. Content store 130 may primarily store advertisements for serving to members, including both revenue and non-revenue ads, but it may also store other content, such as images, documents, video, audio, announcements and so on, for use by various components of system 110. Content server 118 (or some other component of system 110) may include a recommendation module for recommending content to serve.

When content is stored in content store 130, it may be stored with attributes, indications, characteristics and/or other information describing one or more target audiences (e.g., recipients) of the content. For example, a provider of an advertisement may identify relevant attributes and desired values of target members, a provider of a job listing may identify attributes of members that should be informed of the job opening, an organization wishing to obtain more followers/subscribers/fans may identify the type(s) of members it would like to attract, and so on.

In particular, a content item's target audience may identify a particular segment of members or users that the item should be served to. A user segment may be defined in many different ways. For example, different segments may be defined for different values (or ranges of values) for different attributes of profiles of members of the service hosted by system 110. Thus, depending on a given member's data entered for a particular attribute, he or she may be placed in one or more user segments.

User store 128 stores, for each member of system 110, a record of content items served to the member, or served for presentation to the member, and when they were served. In particular, user store 128 may be configured to allow the content server and/or other components of system 110 to quickly determine whether a particular content item was previously presented to a particular member, how many times it was presented, when it was presented, how it was presented (e.g., how prominently or where it was presented within a web page or other page of content), and/or other information. Although some of this data may duplicate what is stored by tracking server 116, contents of user store 128 are rapidly accessible to one or more servers (especially content server 118), and may be used to help select a content item to serve in response to a current request.

Analysis server 120, discussed in more detail below, analyzes member profiles (in database 124) and/or other data (e.g., contents of user store 128 and/or tracking database 126) and attempts to characterize members in ways they have not explicitly characterized themselves, possibly using incomplete or unclear data.

System 110 may include other components not illustrated in FIG. 1. Also, in other embodiments, the functionality of the system may be distributed differently among the illustrated components, such as by merging or further dividing functions of one or more components, or may be distributed among a different collection of components. Yet further, while implemented as separate hardware components (e.g., computer servers) in FIG. 1, one or more of front-end server 112, profile server 114, tracking server 116, content server 118 and analysis server 120 may alternatively be implemented as separate software modules executing on one or more computer servers.

As indicated above, in some embodiments analysis server 120 is configured to identify members who can be justifiably placed into predefined user segments, with or without explicit knowledge that the categorization is apt. For example, it may be helpful to know which members of the site hosted by system 110 are employed by a small- or medium-sized business. Such members may be tagged accordingly, as belonging to a corresponding segment of the user population. This illustrative segment may be termed an SMB (Small and Medium Business) segment. A small or medium business may be defined in a particular manner by system 110 (e.g., as an organization having less than 200 employees), or a definition employed by a third party may be applied (such as a definition used by the Small Business Administration).

Some members may explicitly (and correctly) identify their employer. Further, these members may indicate the sizes of their employers, or their employers' sizes may be readily learned through other sources (e.g., websites of those employers, a web page on system 110 dedicated to the employer, a business directory). These members may be explicitly determined to belong to the SMB segment.

Other members, however, may misspell their employers' names, may use an abbreviation or alternate form of an employer's name, may provide only a partial name, may provide an incorrect name, etc. The system may attempt to infer whether these members belong to the SMB segment.

In other embodiments, analysis server 120 operates to identify members that belong to other segments, such as a segment encompassing employees of not-for-profit organizations, employees of educational institutions, employees within particular industries (e.g., finance, manufacturing), employees or members of specific organizations (e.g., the U.S. government, a state agency, a fraternal organization), etc.

Figure 2:
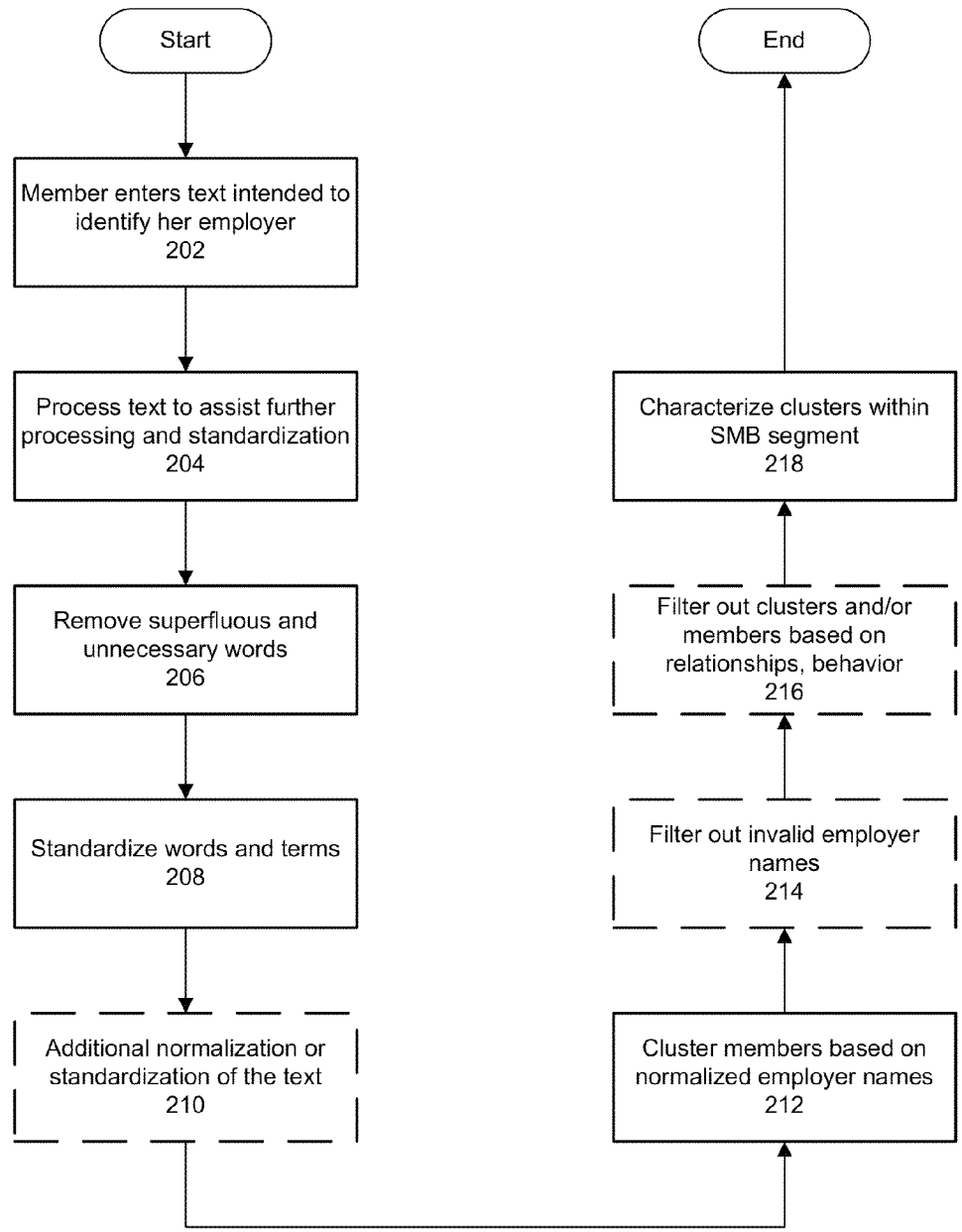
FIG. 2 is a flow chart demonstrating a method of inferring membership in a particular user segment, in accordance with some embodiments.

FIG. 2 is a flow chart demonstrating a method of inferring membership in a particular member segment, according to some embodiments. Although the method is described as it may be applied to infer membership in an SMB segment, it may be modified for use with other member segments, as will be understood by one of ordinary skill in the art.

In operation 202, a member (or user) populates her user profile for an online system or service, and provides information that ostensibly identifies her employer. However, the information does not match any known employer, or at least does not match a standardized or normalized form of known employers' names, and may or may not match any other member's employer data.

The name or description entered by the member may be a partial name, an abbreviation or acronym, or may include a spelling error, a format error or some other error. In short, the data she provides does not identify her employer using a standard or normal name. For example, the member may have entered her preferred or pet name for her employer, rather than selecting from a list of known employers offered by the system or service (if such a list is offered). As another example, she may be the first employee of her employer to have registered with the system.

In some embodiments, the data entered by the member in operation 202 is compared to a list of known employers. If the data matches a known employer, the method may be aborted if the system already knows whether the employer is a small- or medium-sized business, in which case the system can explicitly determine whether the member belongs to the SMB segment.

In some embodiments, an employer is any organization that employs people, including companies, corporations, partnerships, government agencies and departments, not-for-profit entities, etc. A "known" employer may be any employer that has a page or presence on the system (e.g., an employer that is a member of the system's service(s)), that is identified in at least one user's profile (in a normalized/standardized format), or that is otherwise known to exist.

The purported employer name will now be normalized or standardized to allow the system to compare and/or aggregate it with data entered by other members.

In operation 204, some initial processing is applied to the employer name. For example, non-ASCII characters (e.g., å, ñ) may be changed to ASCII characters (e.g., a, n), parts of speech may be identified (e.g., nouns, adjectives), the entry may be parsed (e.g., if it contains a period or comma), extraneous white space (e.g., space characters) may be removed, etc.

In operation 206, select words are removed as necessary from the entry. Words that are removed may include 'stop' words—such as "a," "an," "and," and "the"—except, perhaps, for those that appear as the first word in the employer description. For example, an employer such as "The Johns Hopkins University" may properly include a stop word, whereas other stop words found in the middle or at the end of an entry are likely to be superfluous. However, special cases may be identified that allow retention of a stop word that would otherwise be excised.

Other words that do little or nothing to disambiguate or distinguish between employers may be removed, such as Corporation, Limited, Company, Office, etc. (or abbreviations of these words). These words often appear as suffixes at the end of employers' names.

Removal of stop words and superfluous terms (and/or abbreviations) may be context-sensitive so as not to remove distinctive uses of such words. For example, "Office" may be removed from an employer name such as "Acme Law Office," but not from a name such as "United States Post Office."

Before removing a word in operation 206, the system may try to determine if the word is an acronym, a proper name or whether it otherwise adds meaning to the employer name. For example, in an employer name such as "AND Consulting," the word "AND" should not be removed because it is a distinguishing feature of the name.

In operation 208, words or terms may be standardized if appropriate. For example, abbreviations, acronyms or monikers such as "Ltd.," "Corp.," "Company," "LLP," "Inc.," and so on, may be standardized into formats that do or do not include abbreviations (e.g., "Ltd." versus "Limited", "Corp." versus "Corporation").

In optional operation 210, other normalization or standardization action may be taken, such as to capitalize (or uncapitalize) words, change non-standard spellings (e.g., words spelled differently in British English than in American English), translate from one language into another, add or remove punctuation (e.g., periods, commas), expand an abbreviation or acronym to its full text (or vice versa), etc.

In operation 212, the system clusters members, including the member who provided data in operation 202, based on their normalized employer names. For each unique normalized employer name, clustering may involve counting the number of members that submitted data entries that were normalized into that employer name. In some implementations, the system periodically or regularly performs the processing described herein to normalize unknown employer information of multiple members, and then aggregates any matches.

Thus, if different users entered "JHU," "J.H.U.," "The JHU" and/or other variations of the name "The Johns Hopkins University," the system aggregates some or all of these, with the knowledge that those members were referring to the same employer when they provided their employer data. However, depending on the type and amount of processing above, multiple clusters for one employer may be formed. For example, for an organization whose name includes suffixes, prefixes, stop words, common words and/or words that are often abbreviated or represented by initials, a great variety of name forms may be possible and multiple clusters may result. These clusters may or may not be combined.

In optional operation 214, clusters corresponding to invalid employer names are removed from consideration. Invalid names include names of employers that are non-existent, fictitious, erroneous or invented (e.g., "unemployed," "Retired," "work sucks"), those that consist of profane words or are random sequences of characters that are unlikely to be valid employer names (e.g., "xyzzy"), etc. Illustratively, a member may have entered an invalid name to avoid admitting that she is unemployed, to avoid revealing her employer's name, or for some other purpose.

A human operator of the system may manually identify some invalid names (and/or valid names), and/or may train the system to recognize them. In some embodiments, operation 214 may be executed earlier (e.g., during or after normalization of a member's data entry).

In optional operation 216, members' relationships or behavior are examined to determine whether members that have been clustered together are likely to actually work for the same employer. This operation helps the system avoid improperly characterizing members as belonging to the SMB segment.

In some implementations, in which the system hosts a professional social networking site, the system looks for links between clustered members—such as whether they are friends or associates, whether they share content or exchange messages, etc. Because employees of a single small business (or a medium-sized business) are likely to have at least some common professional relationships and/or person relationships, if few or none of the members grouped into one cluster have formed relationships or shared content, it is possible that they invented the same (or similar) employer name. In some implementations, if at least a threshold of members in the same cluster have not formed at least one social relationship with another member in that cluster (e.g., 10%, 25%, 40%), the cluster may be deemed invalid or some members (e.g., those that have not formed any relationships) may be dropped from the cluster.

In operation 218, remaining clusters that have appropriate numbers of members (e.g., less than 200) are deemed to represent small- and medium-sized businesses. Profiles of these members may be notated appropriately, the members may receive offers, ads and/or other content directed to employees of small- and medium-sized businesses, etc.

The method illustrated in FIG. 2 and described above is but one method by which a system or service that hosts users or members is able to characterize or categorize those users by segment. In other embodiments, the same and/or different operations may be performed in a similar or different manner to obtain a similar result, as will be understood by one of ordinary skill in the art.

In particular, normalization or standardization of employer names entered by members may vary from one embodiment to another, individual normalization operations (e.g., operations 204 through 210 of FIG. 2) may be performed in a different order, fewer (or more) such operations may be performed, etc.

The method of FIG. 2 may be repeated on a regular or irregular basis. A given member's entry for her employer's name may be analyzed multiple times, or may be analyzed only until that name has been normalized and matched with a known employer. As new employer names are learned through this process, they may be added to a list or lists of known employer names.

Figure 3:
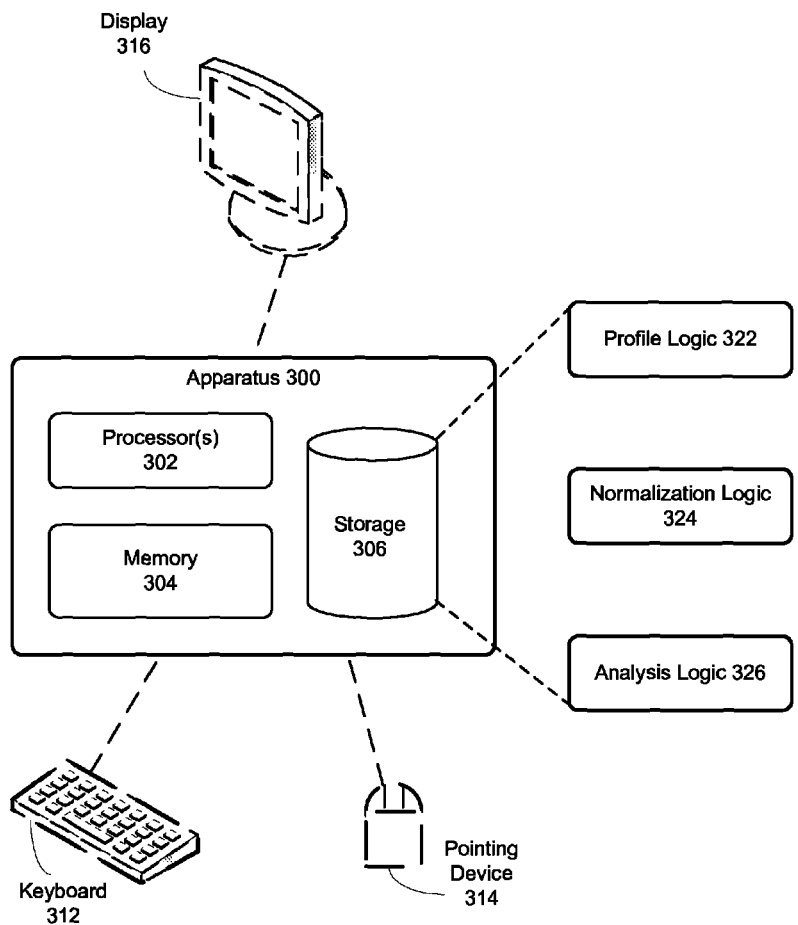
FIG. 3 is a block diagram of an apparatus for segmenting or characterizing users or members of an online system or service, in accordance with some embodiments.

FIG. 3 is a block diagram of an apparatus for segmenting users or members of an online system or service, according to some embodiments.

Apparatus 300 of FIG. 3 comprises processor(s) 302, memory 304 and storage 306, which may comprise one or more optical, solid-state and/or magnetic storage components. Apparatus 300 may be coupled (permanently or transiently) to keyboard 312, pointing device 314, and display 316.

Storage 306 of the apparatus may store content for serving to/for members, member data (e.g., profiles), tracking data, and/or other information. Storage 306 also stores logic that may be loaded into memory 304 for execution by processor 302. Such logic includes profile logic 322, normalization logic 324 and analysis logic 326. In other embodiments, any or all of these logic modules or other content may be combined or divided to aggregate or separate their functionality as desired.

Profile logic 322 comprises processor-executable instructions for assembling or populating member profiles. In some implementations, logic 322 solicits and receives from members information intended to identify their employers, other organizations they are affiliated with (e.g., their schools or universities), products or brands they enjoy, content they enjoy, identities of friends and associates, etc.

Normalization logic 324 comprises processor-executable instructions for normalizing or standardizing data obtained by profile logic 322. As described above, for example, the normalization logic may modify a member's purported employer name to place it into a format with which it can be easily compared and clustered with names of other members' employers. Normalization may include virtually any type of natural language processing, editing, formatting and/or other manipulation.

Analysis logic 326 comprises processor-executable instructions for analyzing member information and characterizing or categorizing them into one or more member segments (e.g., the SMB segment discussed above). Logic 326 may therefore group members that reported the same or similar information for a particular field or part of their profile, filter out invalid data and appropriately categorize members according to the member segments they match. Analysis logic 326 may also operate to filter out invalid data (e.g., fictitious employer names), and may look for interrelationships among members believed to belong to the same category or segment.

In some embodiments of the invention, apparatus 300 performs most or all of the functions described in relation to system 110 of FIG. 1, and such functions may be divided among the same collections of logic depicted in FIG. 3 and/or others. In some particular implementations, apparatus 300 may host multiple virtual computer servers performing the functions of one or more of the servers of system 110.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computer system-implemented method for identifying users associated with employers having a number of employees within a predetermined range, the method comprising operating the computer system to:

receive at a computer processor, from multiple users, employer information identifying the users' employers;

normalize the employer information, using the computer processor, to yield normalized employer names, wherein the normalizing comprises removing one or more superfluous terms;

cluster the multiple users to produce a set of clusters, using the computer processor, based on the normalized employer names, wherein each cluster is associated with a different normalized employer name;

determine, using the computer processor, whether a cluster's associated normalized employer name is invalid, by comparing the associated normalized employer name to a list of known invalid names;

remove clusters corresponding to invalid employer names in the list of known invalid names;

analyze, using the computer processor, social network relationships between members in a single cluster with a valid employer name, to determine whether the members are likely to be employed by the same employer;

determine, using the computer processor, that a cluster is invalid when at least a predetermined threshold of members in the same cluster have not formed at least one social relationship in a social network with another member in that cluster;

remove the determined invalid clusters from the set of clusters, wherein the remaining clusters in the set of clusters are valid clusters;

for each valid cluster in the set of clusters containing a number of users within the predetermined range, categorize users within the cluster, using the computer processor, as being associated with employers having a number of employees within the predetermined range; and based on the categorized users, provide corresponding services to the users in each valid cluster, wherein the corresponding services include at least one of an advertisement or offer.

2. The method of claim 1, wherein analyzing the relationships comprises determining whether the members have formed relationships in a social network.

3. The method of claim 1, wherein analyzing the relationships comprises determining whether the members have exchanged content over a social network.

4. The method of claim 1, further comprising:
for each of one or more clusters, determining whether the cluster's associated normalized employer name is invalid.

5. The method of claim 1, wherein normalizing the employer information comprises standardizing one or more terms of an employer name.

6. The method of claim 1, wherein the predetermined range is between 1 and approximately 200.

7. A computer-readable medium storing instructions that, when executed by a processor, cause the processor to perform a method for identifying users associated with employers having a number of employees within a predetermined range, the method comprising:

receiving at a computer processor, from multiple users, employer information identifying the users' employers;

normalizing the employer information, using the computer processor, to yield normalized employer names;

clustering the multiple users, using the computer processor, based on the normalized employer names, wherein each cluster is associated with a different normalized employer name;

determining, using the computer processor, whether a cluster's associated normalized employer name is invalid by comparing the associated normalized employer name to a list of known invalid names;

removing clusters corresponding to invalid employer names in the list of known invalid names;

analyzing, using the computer processor, social network relationships between members in a single cluster with a valid employer name, to determine whether the members are likely to be employed by the same employer;

determining, using the computer processor, that a cluster is invalid when at least a predetermined threshold of members in the same cluster have not formed at least one social relationship in a social network with another member in that cluster;

removing the determined invalid clusters from the set of clusters, wherein the remaining clusters in the set of clusters are valid clusters;

for each valid cluster containing a number of users within the predetermined range, categorizing users within the cluster, using the computer processor, as being associated with employers having a number of employees within the predetermined range; and based on the categorized users, providing corresponding services to the users in each cluster, wherein the corresponding services include at least one of an advertisement or offer.

8. An apparatus for identifying users associated with employers having a number of employees within a predetermined range, the apparatus comprising:

one or more computer processors; and memory storing instructions that, when executed by the one or more processors, cause the apparatus to:

receive, from multiple users, employer information intended to identifying the users' employers;

normalize the employer information to yield normalized employer names, wherein the normalizing comprises removing one or more superfluous terms;

cluster the multiple users to produce a set of clusters, based on the normalized employer names, wherein each cluster is associated with a different normalized employer name;

determine whether a cluster's associated normalized employer name is invalid, by comparing the associated normalized employer name to a list of known invalid names;

remove clusters corresponding to invalid employer names;

analyze social network relationships between members in a single cluster with a valid employer name, to determine whether the members are likely to be employed by the same employer;

determine that a cluster is invalid when at least a predetermined threshold of members in the same cluster have not formed at least one social relationship in a social network with another member in that cluster;

remove the determined invalid clusters from the set of clusters, wherein the remaining clusters in the set of clusters are valid clusters;

for each valid cluster in the set of clusters containing a number of users within the predetermined range, categorize users within the cluster as being associated with employers having a number of employees within the predetermined range; and based on the categorized users, provide corresponding services to the users in each valid cluster, wherein the corresponding services include at least one of an advertisement or offer.

9. The apparatus of claim 8, wherein analyzing the relationships comprises determining whether the members have formed relationships in a social network.

10. The apparatus of claim 8, wherein analyzing the relationships comprises determining whether the members have exchanged content over a social network.

11. The apparatus of claim 8, the memory further storing instructions that, when executed by the one or more processors, cause the apparatus to:

for each of one or more clusters, determine whether the cluster's associated normalized employer name is invalid.

12. The apparatus of claim 8, wherein normalizing the employer information comprises standardizing one or more terms of an employer name.

13. The apparatus of claim 8, wherein the predetermined range is between 1 and approximately 200.

\* \* \* \* \*